(12) United States Patent
Okamura (10) Patent No.: US 7,760,247 B2
(45) Date of Patent: Jul. 20, 2010

(54) EXPOSURE COMPENSATION IN IMAGE SENSING APPARATUS

(75) Inventor: Satoshi Okamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1073 days.

(21) Appl. No.: 10/728,235

(22) Filed: Dec. 3, 2003

(65) Prior Publication Data

US 2004/0119835 A1 Jun. 24, 2004

(30) Foreign Application Priority Data

Dec. 4, 2002 (JP) .............................. 2002-352716

(51) Int. Cl.
*H04N 5/235* (2006.01)
*H04N 5/228* (2006.01)
*G03B 7/00* (2006.01)

(52) U.S. Cl. .................. 348/229.1; 348/222.1; 348/362
(58) Field of Classification Search ............. 348/229.1, 348/221.1, 220.1, 234, 255, 362, 363
See application file for complete search history.

(56) References Cited

U.S. PATENT DOCUMENTS

| | | | | |
|---|---|---|---|---|
| 5,831,676 A | * | 11/1998 | Takahashi et al. | 348/362 |
| 5,986,705 A | * | 11/1999 | Shibuya et al. | 348/362 |
| 6,389,179 B1 | * | 5/2002 | Katayama et al. | 382/284 |
| 6,903,776 B1 | * | 6/2005 | Tsujino et al. | 348/362 |
| 2002/0080247 A1 | * | 6/2002 | Takahashi et al. | 348/229 |
| 2002/0122133 A1 | * | 9/2002 | Ejima | 348/362 |
| 2003/0071906 A1 | * | 4/2003 | Matsumoto | 348/241 |
| 2004/0070682 A1 | * | 4/2004 | Voss et al. | 348/362 |
| 2004/0119835 A1 | * | 6/2004 | Okamura | 348/207.99 |

FOREIGN PATENT DOCUMENTS

| | | | |
|---|---|---|---|
| JP | 05-167915 | * | 7/1993 |
| JP | 06-189182 | | 7/1994 |
| JP | 2001-257933 | | 9/2001 |
| JP | 2001-298661 | * | 10/2001 |
| JP | 2001-346093 A | | 12/2001 |
| JP | 2002-185848 A | | 6/2002 |
| JP | 2002277204 | * | 9/2002 |

OTHER PUBLICATIONS

Japanese Office Action dated Sep. 2, 2008 from counter part Japanese Patent Application No. 2002-352716.
Japanese Office Action issued on Dec. 2, 2008.

* cited by examiner

*Primary Examiner*—Sinh Tran
*Assistant Examiner*—Christopher K Peterson
(74) *Attorney, Agent, or Firm*—Cowan, Liebowitz & Latman, P.C.

(57) ABSTRACT

An image sensing apparatus includes an image element that outputs a charge signal in accordance with the light amount of an object image formed on a light-receiving surface, a light-shielding unit that shields the image sensing element from incident light, a plurality of compensation units that compensate a loss in exposure amount for the image sensing element caused by operation of the light-shielding unit, a setting unit for setting at least one of an image sensing mode and an image sensing condition, and a compensation control unit that controls a compensation amount for each compensation unit in accordance with the at least one of the image sensing mode and the image sensing condition.

6 Claims, 4 Drawing Sheets

EXPOSURE COMPENSATION IN IMAGE SENSING APPARATUS

FIELD OF THE INVENTION

The present invention relates to an image sensing apparatus which comprises an image sensor and can sense still images.

BACKGROUND OF THE INVENTION

There is conventionally known an image sensing apparatus which uses an image sensor capable of switching between interlaced read operation and frame read operation. By using this image sensor, interlaced read operation can attain image signals with high time resolution in moving image sensing, and frame read operation can attain still images without any time lag between fields in still image sensing.

The schematic arrangement of an image sensing apparatus which comprises a moving image recording function and still image recording function will be described below with reference to FIG. 3.

Figure 3:
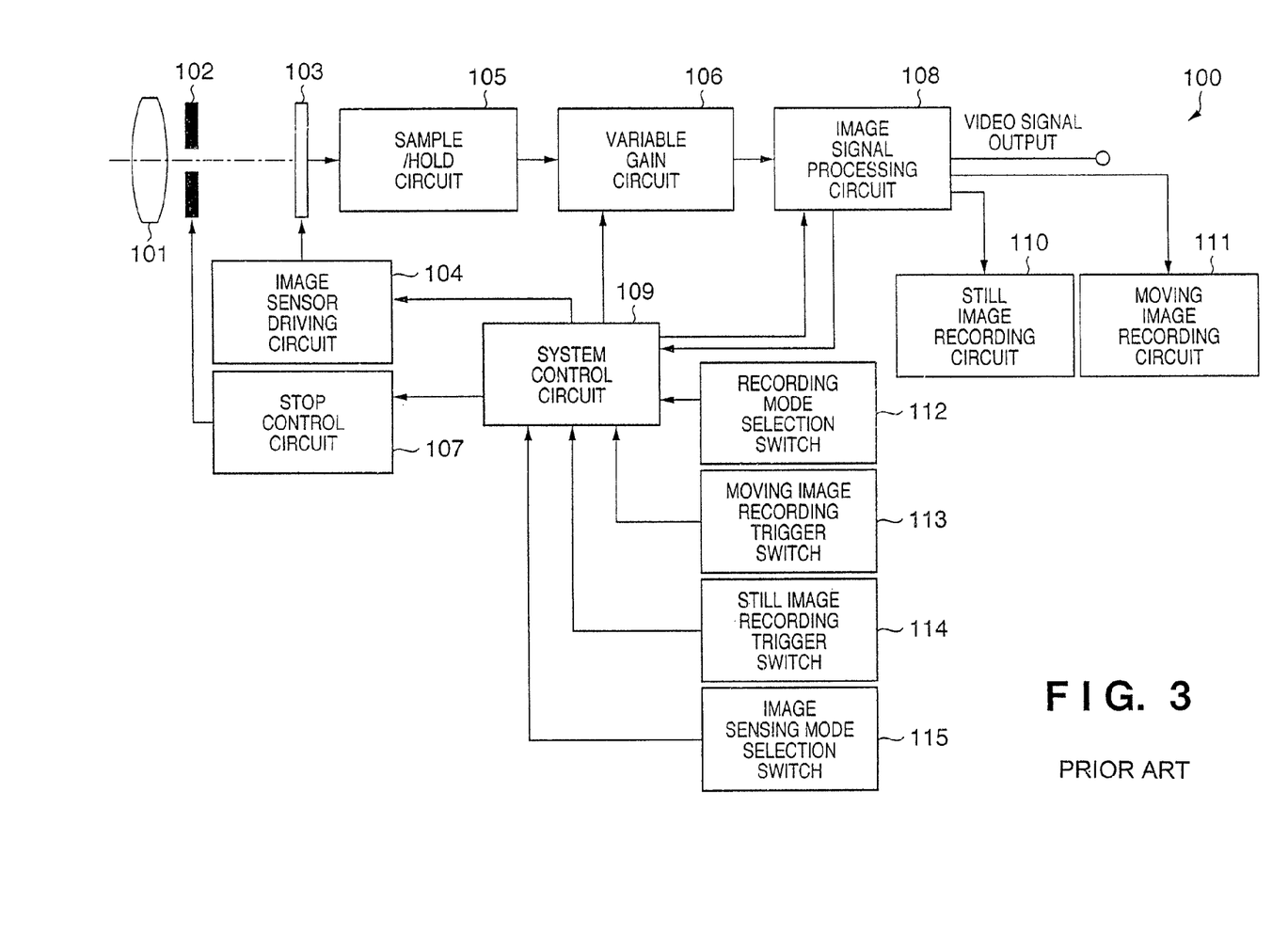
FIG. 3 is a block diagram showing the schematic arrangement of a conventional image sensing apparatus which comprises a moving image recording function and still image recording function.

FIG. 3 is a block diagram showing the schematic arrangement of the image sensing apparatus which comprises a moving image recording function and still image recording function. In FIG. 3, reference numeral 100 denotes an image sensing apparatus which comprises a moving image recording function and still image recording function; 101, an imaging lens which forms an object image on a light-receiving surface of an image sensor 103 (to be described later); 102, a stop which controls the amount of incident light; and 103, the image sensor, which performs photoelectric conversion for the object image formed on the light-receiving surface in accordance with the light amount of the object image to output charge signals. Note that examples of the image sensor 103 include, inter alia, a CCD sensor, CMOS sensor.

Reference numeral 104 denotes an image sensor driving circuit which controls a charge read method, charge accumulation time, and the like of the image sensor 103; 105, a sample/hold circuit which samples and holds a charge signal output from the image sensor 103; 106, a variable gain circuit which changes the gain of a signal output from the sample/hold circuit 105; 107, a stop control circuit which controls the stop 102; and 108, an image signal processing circuit which generates a luminance signal and chrominance signals from an output signal from the variable gain circuit 106, and generates and outputs moving and still image signals on the basis of the generated luminance signal and chrominance signals.

Reference numeral 109 denotes a system control circuit which controls the image sensor driving circuit 104, variable gain circuit 106, stop control circuit 107, and image signal processing circuit 108 and controls the entire image sensing apparatus 100; 110, a still image recording circuit which stores a still image signal output from the image signal processing circuit 108; and 111, a moving image recording circuit which stores a moving image signal output from the image signal processing circuit 108.

A recording mode selection switch 112 is used to select either moving image recording or still image recording and outputs the selected information to the system control circuit 109. A moving image recording trigger switch 113 is used to give instructions to start/end moving image recording and outputs moving image start/end command information to the system control circuit 109. A still image recording trigger switch 114 is used to give instructions to execute still image recording and outputs still image recording execution command information to the system control circuit 109. An image sensing mode selection switch 115 is used to select one of a plurality of image sensing modes such as a full automatic mode, shutter speed priority mode, aperture priority mode, and film speed priority mode and outputs the selected image sensing mode information to the system control circuit 109.

Note that the system control circuit 109 performs the following control such that image sensing conditions are set in accordance with an image sensing mode selected by the image sensing mode selection switch 115. First, the system control circuit 109 outputs driving amount information to the stop control circuit 107 such that the image signal processing circuit 108 outputs a luminance signal of appropriate level. Upon reception of this information, the stop control circuit 107 performs open/close control for the stop 102 such that the exposure amount is appropriate. The system control circuit 109 outputs charge accumulation time information to the image sensor driving circuit 104. Upon reception of this information, the image sensor driving circuit 104 performs electronic shutter speed control to control the exposure by charge accumulation time control. The system control circuit 109 outputs gain information to the variable gain circuit 106. Upon reception of this information, the variable gain circuit 106 performs gain control which controls the gain of a signal output from the image sensor 103 to control the signal level.

If the system control circuit 109 determines on the basis of information input from the recording mode selection switch 112 that a moving image recording mode is selected, it controls the image sensor driving circuit 104 such that the image sensor 103 performs interlaced read operation and controls the image signal processing circuit 108 to perform a process of generating moving image signals. The system control circuit 109 instructs the moving image recording circuit 111 to perform moving image recording.

Likewise, if the system control circuit 109 determines on the basis of the information input from the recording mode selection switch 112 that a still image recording mode is selected, it controls the image sensor driving circuit 104 such that the image sensor 103 performs frame read operation and controls the image signal processing circuit 108 to perform a process of generating still image signals. The system control circuit 109 instructs the still image recording circuit 110 to perform still image recording.

In the interlaced read operation in moving image recording, signals of each pair of adjacent lines of the image sensor 103 are added to each other and read out, and pair formation methods differ between fields. For example, each pair of the first and second lines, the third and fourth lines, . . . are added to each other and read out in an odd-numbered field while each pair of the second and third lines, the fourth and fifth lines, . . . are added to each other and read out in an even-numbered field.

In the frame read operation, signals on the even-numbered lines in the array of pixels of the image sensor 103 are read out in the even-numbered field (first read field) while signals on the odd-numbered lines in the array of pixels of the image sensor 103 are read out in the odd-numbered field (second read field). At this time, a signal of each line is read out without being added to a signal of the immediately preceding line or immediately following line, unlike the interlaced read operation. For this reason, if the image sensor 103 is left exposed after reading signals in the first read field, signal charges are further generated by photoelectric conversion and are accumulated in pixels in the second read field to be read out. This makes a difference in signal level between the even-numbered field and the odd-numbered field. Consequently, a luminance flicker or hue shift occurs to greatly degrade the quality of the photographed image.

To solve the above-mentioned problem, in frame read operation, the image sensor 103 needs to be shielded from incident light at a timing when the image sensor 103 ends charge accumulation. This light-shielding state must be continued until reading of signals on the even-numbered lines in the first read field period and reading of signals on the odd-numbered lines in the second read field period are completed.

To shield the image sensor 103 from incident light, e.g., a mechanical shutter which uses a stop mechanism is employed. Note that a stop mechanism comprises the stop 102 and stop control circuit 107 of FIG. 3. More specifically, upon reception of a light-shielding command from the system control circuit 109, the stop control circuit 107 completely closes the stop 102 to shield light, thereby realizing a function of a mechanical shutter.

However, since the operation time of a mechanical shutter is sufficiently longer than the minimum charge accumulation time of the image sensor 103, light shielding cannot be completed in an instant. If the exposure amount is calculated using a time period until the stop 102 is completely closed as the exposure time, part of light which comes incident during the light shielding operation is lost, thus causing a loss in exposure amount. This loss reduces the signal level of a still image obtained by the frame read operation to a level lower than an optimum signal level which is set by calculation, and still images are recorded at incorrect exposure (underexposure). Under the circumstances, light amount losses caused by mechanical shutter operation need to be corrected.

A method of correcting light amount losses caused by mechanical shutter operation in the image sensing apparatus 100 shown in FIG. 3 will be described with reference to FIG. 4.

Figure 4:
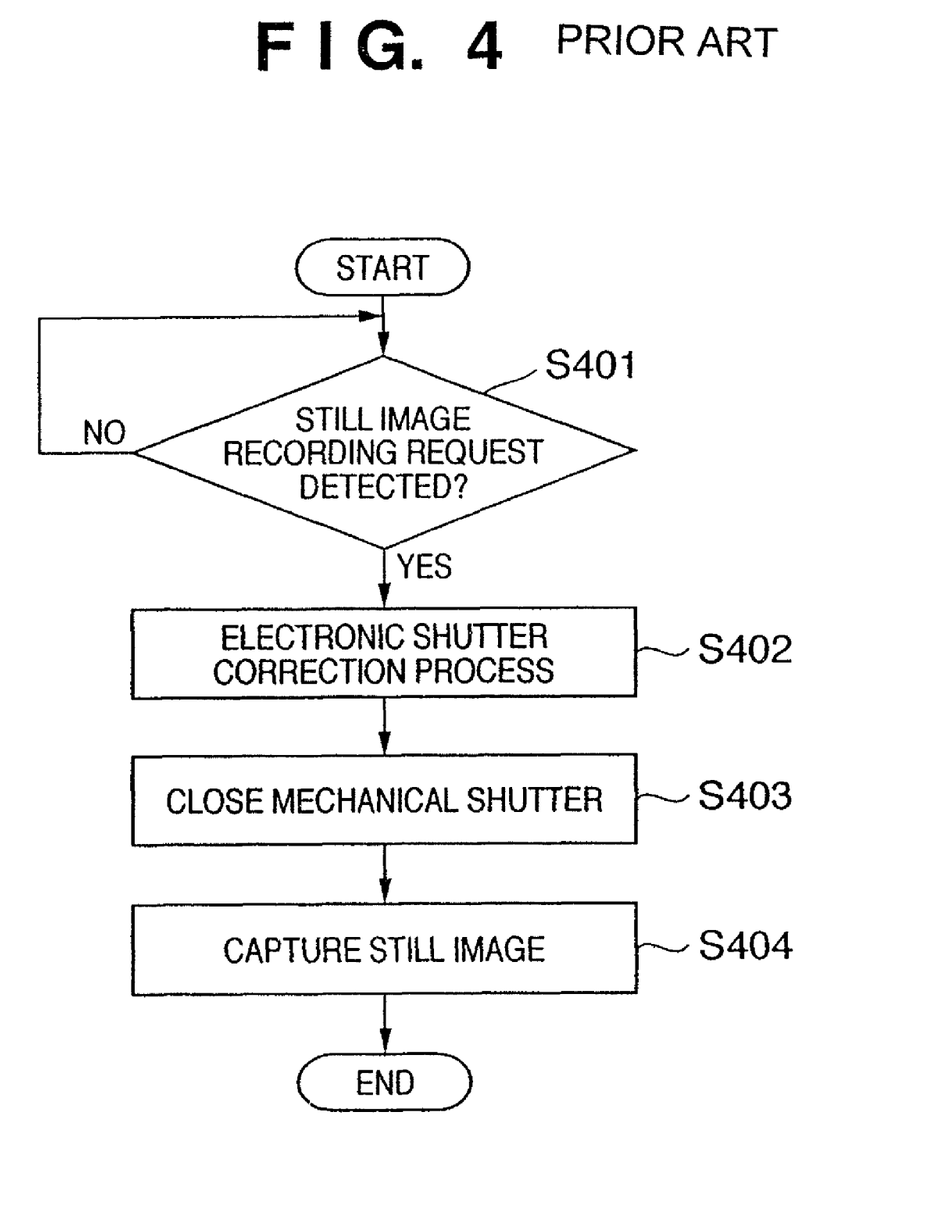
FIG. 4 is a flow chart showing an example of a conventional method of compensating light amount losses caused by mechanical shutter operation in the image sensing apparatus shown in FIG. 3.

FIG. 4 is a flow chart showing an example of a conventional method of correcting light amount losses caused by mechanical shutter operation in the image sensing apparatus 100 shown in FIG. 3. In the example of a correction method shown in FIG. 4, the image sensing apparatus 100 corrects light amount losses only by electronic shutter control. First, in step S401, the system control circuit 109 determines whether it detects a still image recording request which is issued upon operation of the still image recording trigger switch 114. If a still image recording request is detected (YES in step S401), the flow advances to step S402. The system control circuit 109 determines a correction amount of an electronic shutter required for light amount correction from the closing time information of the stop 102 (mechanical shutter) and the current electronic shutter speed information. The system control circuit 109 outputs the corrected electronic shutter speed information to the image sensor driving circuit 104, and the flow advances to step S403. If no still image recording request is detected (NO in step S401), the system control circuit 109 continues the detection operation in step S401 until it detects the request.

In step S403, the system control circuit 109 controls a closing start timing such that the stop 102 (mechanical shutter) ends closing operation at a predetermined timing. The system control circuit 109 issues a closing command to the stop control circuit 107 at a predetermined timing. Upon reception of this command, the stop control circuit 107 controls the stop 102 (mechanical shutter) so as to end the closing operation at the predetermined timing. After the stop 102 (mechanical shutter) is completely closed to shield light in step S403, the flow advances to step S404. The system control circuit 109 controls the image sensor driving circuit 104, thereby reading out charge signals from the image sensor 103 in an even-numbered field and odd-numbered field. The system control circuit 109 causes the image signal processing circuit 108 to generate a still image on the basis of the charge signals. Then, the still image recording circuit 110 stores the still image generated by the image signal processing circuit 108.

By the above-mentioned operation, the image sensing apparatus 100 can generate and record still images whose light amount losses caused by mechanical shutter operation are corrected.

Various image sensing modes are available in the image sensing apparatus 100, and any of them can be selected in accordance with a scene to be sensed. For example, image sensing modes such as a shutter speed priority mode in which the user selects or sets the electronic shutter speed and a film speed priority mode in which the user selects or sets the gain control information are known. The image sensing apparatus 100 further has a function of setting individual image sensing conditions such as the shutter speed and exposure amount to suit the preferences of the user.

However, since light amount losses caused by mechanical shutter operation are conventionally corrected without regard to the above-mentioned image sensing modes, image degradation may occur. For example, assume that the user selects a high shutter speed in the shutter priority mode. In this case, if the system control circuit 109 performs exposure correction by controlling the electronic shutter to operate at a low speed to correct light amount losses caused by mechanical shutter operation, a greatly blurred object image is obtained. Likewise, assume that the user selects a low film speed in the film speed priority mode. In this case, if the system control circuit 109 performs exposure correction by gain control to correct light amount losses caused by mechanical shutter operation, an image with a low S/N ratio is obtained.

SUMMARY OF THE INVENTION

The present invention has been made in consideration of the above situation, and has as its object to perform proper compensation in accordance with a predetermined image sensing mode or predetermined image sensing conditions in compensation of light amount losses caused by mechanical shutter operation at the time of exposure.

According to the present invention, the foregoing object is attained by providing an image sensing apparatus comprising: an image sensing element that outputs a charge signal in accordance with a light amount of an object image formed on a light-receiving surface; a light-shielding unit that shields the image sensing element from incident light; a plurality of compensation units that compensate a loss in exposure amount for the image sensing element caused by operation of the light-shielding unit; a setting unit for setting at least one of an image sensing mode and an image sensing condition; and a compensation control unit that controls a compensation amount for each compensation unit in accordance with the at least one of the image sensing mode and the image sensing condition that is set by the setting unit.

According to the present invention, the foregoing object is also attained by providing a method of controlling an image sensing apparatus comprising an image sensing element that outputs a charge signal in accordance with a light amount of an object image formed on a light-receiving surface, a light-shielding unit that shields the image sensing element from incident light, a plurality of compensation units that compensate a loss in exposure amount for the image sensing element caused by operation of the light-shielding unit, and a setting unit for setting at least one of an image sensing mode and an image sensing condition, wherein a compensation amount for each compensation unit is controlled in accordance with the at least one of the image sensing mode and the image sensing condition that is set by the setting unit.

According to the present invention, the foregoing object is also attained by providing a method of controlling an image sensing apparatus comprising an image sensing element that outputs a charge signal in accordance with a light amount of an object image formed on a light-receiving surface, a light-shielding unit that shields the image sensing element from incident light, a plurality of compensation units that compensate a loss in exposure amount for the image sensing element caused by operation of the light-shielding unit, and a setting unit for setting at least one of an image sensing mode and an image sensing condition, wherein a priority order is given to each of the plurality of compensation units in accordance with the at least one of the image sensing mode and the image sensing condition that is set by the setting unit, and the compensation amount for each compensation unit is controlled in accordance with the priority order.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

The schematic arrangement of an image sensing apparatus according to an embodiment of the present invention is similar to that of the conventional image sensing apparatus shown in FIG. 3, and its description will be omitted. An image sensing apparatus 100 according to the embodiment of the present invention can sense still images and moving images. An image sensor 103 is driven by interlaced read operation in a moving image recording mode and is driven by frame read operation in a still image recording mode, thereby recording moving and still image signals.

However, the image sensing apparatus 100 according to the embodiment of the present invention performs different control processing by a system control circuit 109 from that explained in the background of the invention. The different processing is performed as the exposure amount compensation process of the image sensing apparatus 100. In this processing, the system control circuit 109 compensates light amount losses generated upon mechanical shutter operation in accordance with an image sensing mode set by the user. The different processing is realized by changing a control program stored in the system control circuit 109. With this arrangement, the image sensing apparatus 100 can realize a process according to the embodiment of the present invention without changing hardware. Note that the process can be also realized by changing a hardware arrangement.

First Embodiment

The first embodiment will be described first as the exposure amount compensation process of an image sensing apparatus 100. In the first embodiment, a system control circuit 109 compensates light amount losses generated upon mechanical shutter operation in accordance with an image sensing mode set by the user.

In the first embodiment, if image sensing mode information obtained from an image sensing mode selection switch 115 indicates a shutter priority mode, the system control circuit 109 compensates, by gain control, light amount losses generated upon mechanical shutter operation. If an image sensing mode other than the shutter priority mode is selected, the system control circuit 109 compensates the light amount losses generated upon mechanical shutter operation by electronic shutter speed control.

A process as described above (to be referred to as an exposure amount compensation process) will be described. In this process, the system control circuit 109 included in the image sensing apparatus 100 switches between compensation methods for light amount losses caused by mechanical shutter operation, in accordance with an image sensing mode set by the user.

Figure 1:
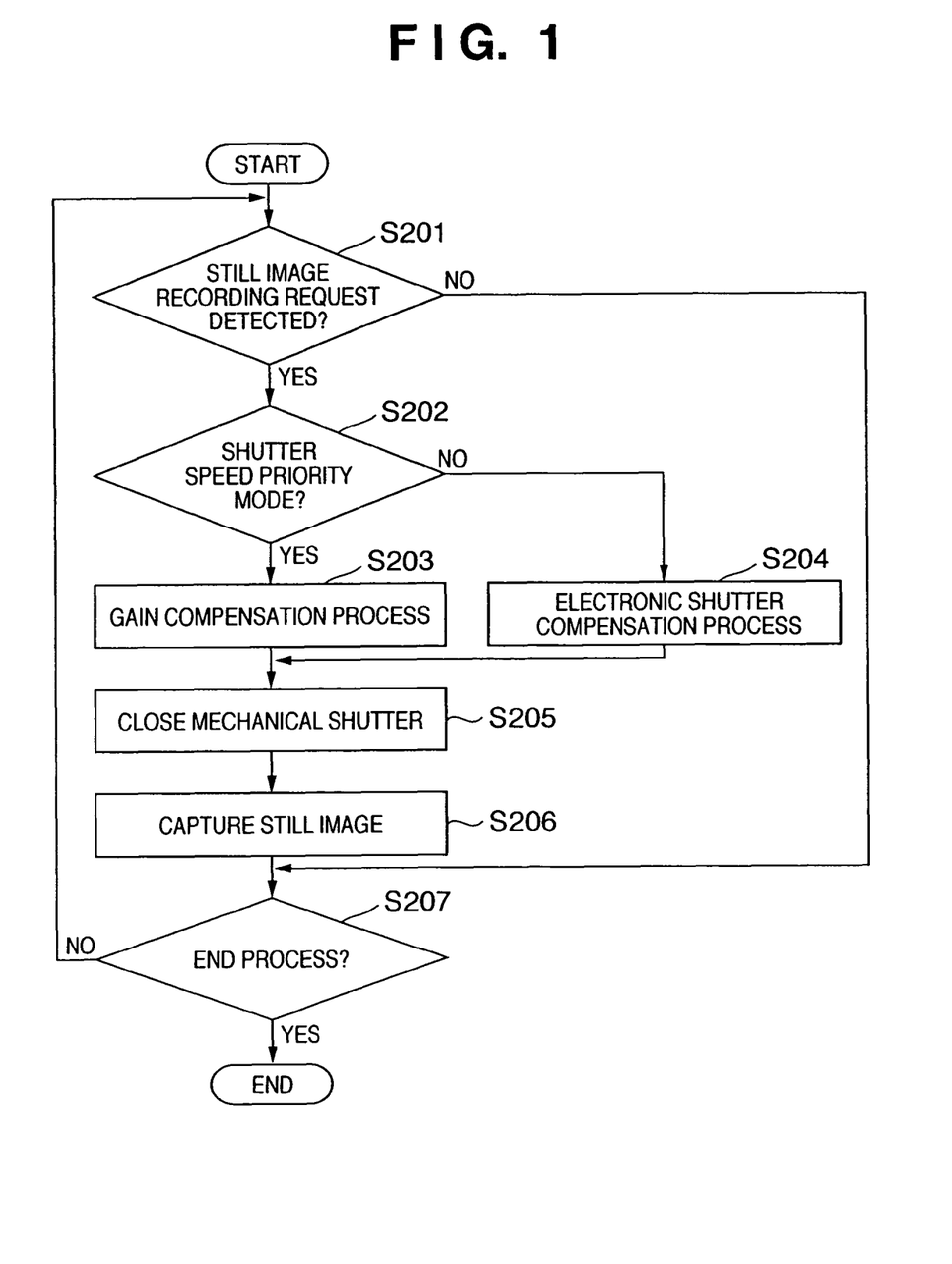
FIG. 1 is a flow chart showing the exposure amount compensation process of a system control circuit in an image sensing apparatus according to the first embodiment of the present invention.

FIG. 1 is a flow chart showing the exposure amount compensation process of the system control circuit 109 included in the image sensing apparatus 100 according to the first embodiment of the present invention. Note that the flow chart of FIG. 1 is assumed to start when the image sensing apparatus 100 is powered on and is set at a still image recording mode.

First, in step S201, the system control circuit 109 determines whether it detects, from a still image recording trigger switch 114, a still image recording request which is issued upon operation of the still image recording trigger switch 114. If a still image recording request is detected (YES in step S201), the flow advances to step S202; otherwise (NO in step S201), the flow advances to step S207.

In step S202, the system control circuit 109 determines whether the image sensing mode at the point of issuance of the still image recording request is the shutter speed priority mode. If the image sensing mode is set at the shutter speed priority mode (YES in step S202), the flow advances to step S203. If another image sensing mode is selected (NO in step S202), the flow advances to step S204. Note that the shutter speed priority mode is a mode in which a higher priority is given to exposure amount adjustment by adjusting the shutter speed of an electronic shutter in exposure amount control. Other image sensing modes include, e.g., an aperture priority mode, in which a higher priority is given to exposure amount adjustment by adjusting the f-number in exposure amount control.

In step S203, the system control circuit 109 determines a gain control amount required to compensate light amount losses generated upon mechanical shutter operation from the closing time information of the stop 102 (mechanical shutter) and the current electronic shutter speed information. The system control circuit 109 outputs the determined gain control amount to a variable gain circuit 106, and the flow advances to step S205. The variable gain circuit 106 can properly compensate, by gain control, light amount losses generated upon mechanical shutter operation. Note that the above-mentioned current electronic shutter speed information includes, e.g., information on the electronic shutter speed which is set concurrently with the setting of the shutter speed priority mode.

In step S204, the system control circuit 109 determines a compensation amount of the electronic shutter required to compensate light amount losses generated upon mechanical shutter operation from the closing time information of the stop 102 (mechanical shutter) and the current electronic shutter speed information. The system control circuit 109 outputs the determined electronic shutter speed information to an image sensor driving circuit 104, and the flow advances to step S205. Upon reception of this information, the image sensor driving circuit 104 can properly compensate, by the electronic shutter, light amount losses generated upon mechanical shutter operation.

In step S205, the system control circuit 109 controls a closing start timing of the stop 102 (mechanical shutter) such that the stop 102 ends closing operation at a predetermined timing. The system control circuit 109 issues a closing command to a stop control circuit 107 at a predetermined timing, and the flow advances to step S206. Upon reception of this command, the stop control circuit 107 can control the stop 102 (mechanical shutter) so as to complete the closing operation at the predetermined timing.

In step S206, after the stop 102 (mechanical shutter) is completely closed to shield light, the system control circuit 109 controls the processing units so as to perform the following processing. First, signal charges on even-numbered lines and odd-numbered lines are read out from the image sensor 103 in an even-numbered field and odd-numbered field, respectively, to output charge signals. The system control circuit 109 causes an image signal processing circuit 108 to generate a still image on the basis of the charge signals. Then, the system control circuit 109 causes a still image recording circuit 110 to store the still image generated by the image signal processing circuit 108, and the flow advances to step S207.

In step S207, the system control circuit 109 determines whether it detects an end command such as a still image recording mode end command, power OFF command, or the like. If an end command is detected (YES in step S207), the processing of FIG. 1 ends; otherwise (NO in step S207), the flow returns to step S201. In step S201, the still image recording command detection processing starts.

As described above, the image sensing apparatus 100 according to the first embodiment uses gain control to compensate light amount losses caused by mechanical shutter operation when the shutter speed priority mode is selected as the image sensing mode. For this reason, even still image recording at a shutter speed selected by the user can attain an image free from underexposure. Also, the image sensing apparatus 100 according to the first embodiment compensates light amount losses caused by mechanical shutter operation by electronic shutter speed control when an image sensing mode other than the shutter speed priority mode is selected. This enables the image sensor 103 to obtain an appropriate amount of signal charge, thus attaining an image sensing result with a good S/N ratio.

Additionally, the effect of the image sensing apparatus 100 according to the first embodiment will be described in comparison with a conventional image sensing apparatus. In conventional exposure correction, a method of adjusting an electronic shutter speed is used to perform exposure correction of light amount losses caused by mechanical shutter operation. For this reason, even if the user selects an electronic shutter speed suitable for sensing an object, the electronic shutter speed becomes less optimal. For example, assume that the user sets the shutter speed at a high speed (the user wants to record a still image of a moving object while suppressing blur of the image). In this case, if the electronic shutter speed is adjusted to a lower speed, the recorded still image is blurred.

In the image sensing apparatus 100 according to the first embodiment, however, exposure compensation can be performed while maintaining a high shutter speed. Accordingly, even if an object is moving, a still image with proper brightness can be obtained without any blur.

Second Embodiment

The second embodiment will be described as the exposure amount compensation process of an image sensing apparatus 100 shown in FIG. 3. The second embodiment is a process different from that in the first embodiment.

In the second embodiment, switching is performed between a plurality of compensation processes having different upper compensation amount limits and compensation orders in accordance with electronic shutter speed information at the point of operation of a still image recording trigger switch.

More specifically, a system control circuit 109 compensates light amount losses caused by mechanical shutter operation using a plurality of exposure compensation methods alone or in combination in accordance with an electronic shutter speed before mechanical shutter operation. In the second embodiment, a compensation method using an electronic shutter speed control mechanism and a compensation method using a gain control mechanism are employed as the plurality of compensation methods. In the second embodiment of the present invention, the system control circuit 109 switches control contents between electronic shutter speed control and gain control, depending on whether the electronic shutter speed is, e.g., 1/500 sec or more. Note that a measure of determination for the electronic shutter speed may be a value other than 1/500 sec.

Figure 2:
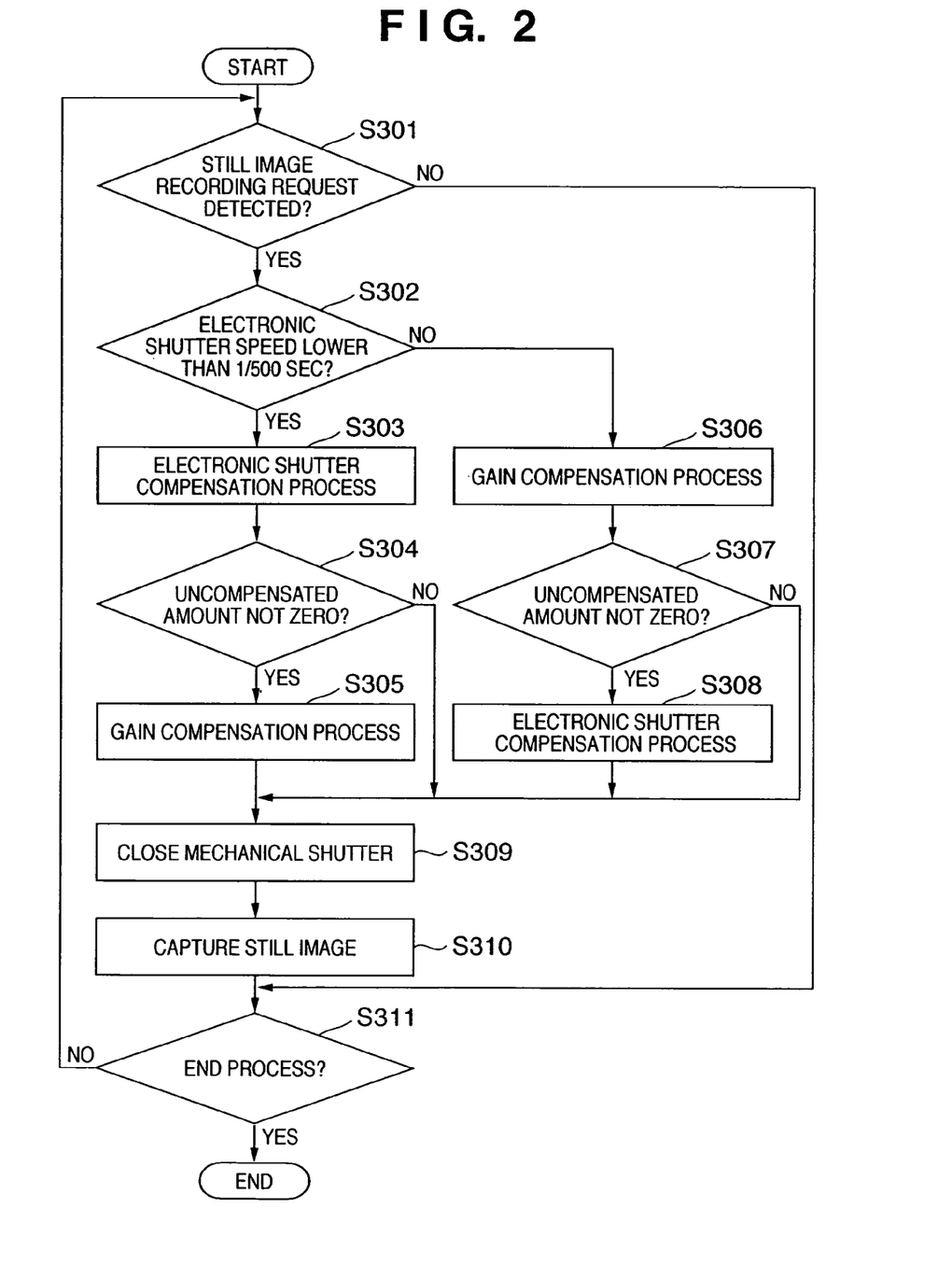
FIG. 2 is a flow chart showing the exposure amount compensation process of a system control circuit in an image sensing apparatus according to the second embodiment of the present invention.

FIG. 2 is a flow chart showing the exposure amount compensation process of the system control circuit 109 in the image sensing apparatus 100 according to the second embodiment of the present invention. Note that the flow chart of FIG. 2 is assumed to start when the image sensing apparatus 100 is powered on and is set at a still image recording mode.

First, in step S301, the system control circuit 109 determines whether it detects a still image recording request which is issued upon operation of a still image recording trigger switch 114. If a still image recording request is detected (YES in step S301), the flow advances to step S302; otherwise (NO in step S301), the flow advances to step S311. In step S302, the system control circuit 109 determines whether the electronic shutter speed at the point of issuance of the recording request is lower than 1/500 sec. If the shutter speed is lower than 1/500 sec (YES in step S302), the flow advances to step S303; otherwise, the flow advances to step S306.

In step S303, the system control circuit 109 determines a compensation amount of the electronic shutter speed required for compensation from the closing time information of a stop 102 (mechanical shutter) and the current electronic shutter speed information, and the flow advances to step S304. In step S303, the system control circuit 109 determines the compensation amount of the electronic shutter speed while limiting it so as not to exceed a predetermined upper compensation amount limit. The system control circuit 109 outputs the electronic shutter speed information corresponding to the determined compensation amount to an image sensor driving circuit 104. Upon reception of this information, the image sensor driving circuit 104 drives an image sensor 103 at the determined electronic shutter speed. The system control circuit 109 defines any surplus over the upper compensation amount limit as an uncompensated amount. If the compensation amount does not exceed the upper compensation amount limit, the uncompensated amount is set at 0.

In step S304, the system control circuit 109 determines whether the uncompensated amount, which has been described in step S303, is 0. If the uncompensated amount is equal to 0 (NO in step S304), the system control circuit 109 determines that no more compensation is necessary, and the flow advances to step S309. On the other hand, if the uncompensated amount is more than 0 (YES in step S304), the system control circuit 109 determines that further compensation needs to be performed, and the flow advances to step S305.

In step S305, the system control circuit 109 determines a gain control amount required for compensation on the basis of the uncompensated amount obtained in step S303. The system control circuit 109 outputs the determined gain control amount to a variable gain circuit 106, and the flow advances to step S309. Upon reception of this gain control amount, the variable gain circuit 106 can cope, by gain control, with part of compensation which the image sensor 103 cannot cope with by electronic shutter speed control.

If NO in step S302 (1/500 sec or faster), the system control circuit 109 determines, in step S306, the gain control amount required for compensation from the closing time information of the stop 102 (mechanical shutter) and the current electronic shutter speed information, and the flow advances to step S307. In this step S306, the system control circuit 109 determines the compensation amount by gain control while limiting it so as not to exceed a predetermined upper compensation amount limit. The system control circuit 109 outputs the determined gain control amount to the variable gain circuit 106. Upon reception of this gain control amount, the variable gain circuit 106 can perform gain control for the compensation amount limited by the upper compensation amount limit. The system control circuit 109 defines any surplus over the upper compensation amount limit as an uncompensated amount. If the compensation amount does not exceed the upper compensation amount limit, the uncompensated amount is set at 0.

In step S307, the system control circuit 109 determines whether the uncompensated amount of gain control, which has been described in step S306, is 0. If the uncompensated amount is equal to 0 (NO in step S307), the system control circuit 109 determines that no more compensation is necessary, and the flow advances to step S309. On the other hand, if the uncompensated amount is more than 0 (YES in step S307), the system control circuit 109 determines that further compensation needs to be performed, and the flow advances to step S308.

In step S308, the system control circuit 109 determines the electronic shutter speed required for compensation on the basis of the uncompensated amount of gain control, which is obtained in step S306. The system control circuit 109 outputs the determined electronic shutter speed information to the image sensor driving circuit 104, and the flow advances to step S309. Upon reception of this information, the image sensor driving circuit 104 drives the image sensor 103 at the determined electronic shutter speed.

In step S309, the system control circuit 109 controls a closing start timing such that the stop 102 (mechanical shutter) ends closing operation at a predetermined timing. The system control circuit 109 issues a closing command to a stop control circuit 107 at a predetermined timing, and the flow advances to step S310. Upon reception of this command, the stop control circuit 107 causes the stop 102 (mechanical shutter) to complete the closing operation at the predetermined timing, thereby shielding the image sensor 103 from incident light.

In step S310, after the stop 102 (mechanical shutter) is completely closed to shield light, the system control circuit 109 controls the processing units so as to perform the following processing. First, signal charges on even-numbered lines and odd-numbered lines are read out from the image sensor 103 in an even-numbered field and odd-numbered field, respectively, to output charge signals. The system control circuit 109 causes an image signal processing circuit 108 to generate a still image on the basis of the charge signals. Then, the system control circuit 109 causes a still image recording circuit 110 to store the still image generated by the image signal processing circuit 108, and the flow advances to step S311.

In step S311, the system control circuit 109 determines whether it detects an end command such as a still image recording mode end command, power OFF command, or the like. If an end command is detected (YES in step S311), the processing of FIG. 2 ends; otherwise (NO in step S311), the flow returns to step S301. In step S301, the still image recording command detection processing starts.

As described above, the image sensing apparatus 100 according to the second embodiment compensates light amount losses caused by mechanical shutter operation using a plurality of exposure compensation methods alone or in combination in accordance with the shutter speed in image sensing operation. If the shutter speed is high, a higher priority is given to compensation by gain control. This avoids a decrease in shutter speed, thus attaining an image sensing result whose image degradation due to compensation processing is suppressed.

The use of a compensation amount which starts causing larger image degradation by gain control than by decreasing the electronic shutter speed as the upper compensation amount limit can further avoid image degradation. If the shutter speed is low, an image whose degradation due to compensation processing by gain control is suppressed can be obtained by preferentially performing compensation by adjusting the electronic shutter speed. If the electronic shutter speed cannot be set at a speed lower than one field period due to circuit operation and the like, a circuit malfunction can be avoided by using the compensation amount as the upper compensation amount limit.

Additionally, the effect of the image sensing apparatus 100 according to the second embodiment will be described in comparison with a conventional image sensing apparatus. Assume that exposure correction of light amount losses caused by mechanical shutter operation is performed by electronic shutter speed control at a shutter speed as high as, e.g., 1/500 sec selected as an image sensing condition. In conventional exposure correction, a method of adjusting an electronic shutter speed is used to perform exposure correction of light amount losses caused by mechanical shutter operation. For this reason, even if the user selects an electronic shutter speed suitable for an object, the electronic shutter speed becomes less optimal. For example, assume that the user sets the shutter speed at a high speed. In this case, if the electronic shutter speed is adjusted to a lower speed, the recorded still image may be blurred.

In contrast, in the image sensing apparatus 100 according to the second embodiment, compensation by gain control can be performed while maintaining a high shutter speed. Accordingly, even if an object is moving, a still image with proper brightness can be obtained without any blur.

Assume that the shutter speed is set at a low speed which extends one or a plurality of field periods such that the image sensor 103 realizes long exposure by long-time charge accumulation. In this case, since the electronic shutter speed cannot be lowered below the set speed, electronic shutter speed control cannot be utilized to perform compensation in mechanical shutter operation.

However, the image sensing apparatus 100 according to the second embodiment can preferentially perform compensation by gain control, thus attaining an image whose degradation due to compensation processing is suppressed.

As described above, exposure amount losses for the image sensor which are caused by a light-shielding means (mechanical shutter) can properly be compensated in accordance with a predetermined image sensing mode or predetermined image sensing conditions.

In the above-mentioned embodiments, a stop mechanism also serves as a mechanical shutter. However, the present invention is not limited to this. For example, a mechanical shutter may separately be provided between the stop 102 and the image sensor 103. Although image sensing apparatuses capable of image sensing both moving and still images are described as the embodiments of the present invention, the present invention is not limited to this. The present invention can also be applied to an image sensing apparatus which allows setting of various image sensing conditions, has a mechanical shutter, and requires compensation of light amount losses caused by mechanical shutter operation. The above-mentioned image sensing mode is an operation mode of an image sensing apparatus for setting image sensing conditions corresponding to an assumed object. More specifically, when the user selects the image sensing mode, an algorithm which automatically sets the image sensing conditions of the image sensing apparatus is specified.

Each process performed by the system control circuit 109 shown in FIG. 3 may be implemented by dedicated hardware. Alternatively, the system control circuit 109 may be constituted by a memory and CPU, and a program for implementing each process may be loaded into the memory to implement the process.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:

an image sensing element that outputs a charge signal in accordance with a light amount of an object image formed on a light-receiving surface;

a light-shielding unit that shields said image sensing element from incident light;

a determination unit that determines a compensation amount for compensating a loss in exposure amount for said image sensing element caused by delay in closing of said light-shielding unit;

a setting unit that sets an exposure period of said image sensing element; and a control unit that changes the set exposure period based on the compensation amount determined by said determination unit if the exposure period is longer than a predetermined period, and changes a gain to be applied to the charge signal based on the compensation amount determined by said determination unit if the exposure period is equal to or shorter than the predetermined period, wherein, if the set exposure period is longer than the predetermined period and if the compensation amount determined by said determination unit is greater than an upper limit of compensation amount of exposure period, said control unit changes the exposure period based on the upper limit of compensation amount of exposure period and changes the gain so as to compensate the rest of the compensation amount which is not compensated after changing the exposure period.

2. An image sensing apparatus comprising
an image sensing element that outputs a charge signal in accordance with a light amount of an object image formed on a light-receiving surface;
a light-shielding unit that shields said image sensing element from incident light;
a determination unit that determines a compensation amount for compensating a loss in exposure amount for said image sensing element caused by delay in closing of said light-shielding unit;
a setting unit that sets an exposure period of said image sensing element; and
a control unit that changes the set exposure period based on the compensation amount determined by said determination unit if the exposure period is longer than a predetermined period, and changes a gain to be applied to the charge signal based on the compensation amount determined by said determination unit if the exposure period is equal to or shorter than the predetermined period,
wherein, if the set exposure period is equal to or shorter than the predetermined period and if the compensation amount determined by said determination unit is greater than an upper limit of compensation amount of gain to be applied to the charge signal, said control unit changes the gain based on the upper limit of compensation amount of gain and changes the exposure period so as to compensate the rest of the compensation amount which is not compensated after changing the gain.

3. An image sensing apparatus comprising
an image sensing element that outputs a charge signal in accordance with a light amount of an object image formed on a light-receiving surface;
a light-shielding unit that shields said image sensing element from incident light;
a determination unit that determines a compensation amount for compensating a loss in exposure amount for said image sensing element caused by delay in closing of said light-shielding unit;
a setting unit that sets an exposure period of said image sensing element;
a control unit that changes the set exposure period based on the compensation amount determined by said determination unit if the exposure period is longer than a predetermined period, and changes a gain to be applied to the charge signal based on the compensation amount determined by said determination unit if the exposure period is equal to or shorter than the predetermined period; and
an image sensing mode setting unit that sets an image sensing mode,
wherein said control unit changes the set exposure period based on the compensation amount determined by said determination unit if the exposure period is longer than a predetermined period, even if the image sensing mode set by said image sensing mode setting unit is an image sensing mode of controlling exposure by keeping an exposure period set by said setting unit.

4. A control method for an image sensing apparatus having an image sensing element that outputs a charge signal in accordance with a light amount of an object image formed on a light-receiving surface and a light-shielding unit that shields said image sensing element from incident light, said method comprising:
determining a compensation amount for compensating a loss in exposure amount for said image sensing element caused by delay in closing of said light-shielding unit;
setting an exposure period of said image sensing element;
changing the set exposure period based on the determined compensation amount if the exposure period is longer than a predetermined period, and changing a gain to be applied to the charge signal based on the determined compensation amount if the exposure period is equal to or shorter than the predetermined period,
wherein, if the set exposure period is longer than the predetermined period and if the determined compensation amount is greater than an upper limit of compensation amount of exposure period, in said changing step, the exposure period is changed based on the upper limit of compensation amount of exposure period and the gain is changed so as to compensate the rest of the compensation amount which is not compensated after changing the exposure period, for said image sensing element.

5. A control method for an image sensing apparatus having an image sensing element that outputs a charge signal in accordance with a light amount of an object image formed on a light-receiving surface and a light-shielding unit that shields said image sensing element from incident light, said method comprising:
determining a compensation amount for compensating a loss in exposure amount for said image sensing element caused by delay in closing of said light-shielding unit;
setting an exposure period of said image sensing element;
changing the set exposure period based on the determined compensation amount if the exposure period is longer than a predetermined period, and changing a gain to be applied to the charge signal based on the determined compensation amount if the exposure period is equal to or shorter than the predetermined period,
wherein, if the set exposure period is equal to or shorter than the predetermined period and if the determined compensation amount is greater than an upper limit of compensation amount of gain to be applied to the change signal, and in said changing step, the gain is changed based on the upper limit of compensation amount of gain and the exposure period is changed so as to compensate the rest of the compensation amount which is not compensated after changing the gain.

6. A control method for an image sensing apparatus having an image sensing element that outputs a charge signal in accordance with a light amount of an object image formed on a light-receiving surface and a light-shielding unit that shields said image sensing element from incident light, said method comprising:
determining a compensation amount for compensating a loss in exposure amount for said image sensing element caused by delay in closing of said light-shielding unit;
setting an exposure period of said image sensing element;
changing the set exposure period based on the determined compensation amount if the exposure period is longer than a predetermined period, and changing a gain to be applied to the charge signal based on the determined compensation amount if the exposure period is equal to or shorter than the predetermined period; and
setting an image sensing mode,
wherein the set exposure by keeping a set exposure period, the set exposure period is changed based on the determined compensation amount if the exposure period is longer than a predetermined period, even if the set image sensing mode is an image sensing mode of controlling exposure by keeping a set exposure period.

* * * * *